United States Patent Office 3,499,840
Patented Mar. 10, 1970

3,499,840
CHLORINE DERIVATIVES OF m-DIPHENOXY-BENZENE AND PROCESS OF PREPARATION THEREOF
Albert L. Williams, Hopewell Township, Mercer County, N.J., assignor to Mobil Oil Corporation, a corporation of New York
No Drawing. Filed Jan. 2, 1969, Ser. No. 789,066
Int. Cl. C10m 1/20, 1/30
U.S. Cl. 252—54           8 Claims

ABSTRACT OF THE DISCLOSURE

Mixtures of mono-and di-chloro derivatives of m-diphenoxybenzene provide lubricants stable at high temperatures. The derivatives are formed by reacting, in the absence of molecular oxygen, a dialkali metal salt of resorcinol, a monohalobenzene and a m- or p-halochlorobenzene, in the presence of a copper salt catalyst and in certain solvents.

RELATED APPLICATIONS

The process of this invention is related to the process described in application U.S. Ser. No. 490,072, filed Sept. 24, 1965 (now U.S. Patent 3,450,772), as a continuation-in-part of application Ser. No. 416,127, filed Dec. 4, 1964, and later abandoned.

This invention has to do with chlorine derivatives of m-diphenoxybenzene, with lubricant compositions containing such derivatives and with a method of preparation of such derivatives.

As is well-known in the art, polyphenyl ethers such as diphenoxybenzenes having 4 to 5 benzene rings have been proposed as lubricants for use in extreme environments, such as high temperatures. Studies made to improve properties of the polyphenyl ethers have lead to the conclusion that, except for phenyl substituents, all other substituents appreciably reduce the thermal stability, and that the least adverse effect has been realized with chlorine substituents on bis(p-phenoxyphenyl)ether. ("Synthetic Lubricants," by R. C. Gunderson and A. W. Hart, Reinhold Publishing Corp., N.Y., 1962, page 433.)

In contrast to such prior art conclusions, it has now been found that mixtures of certain chlorine derivatives of metadiphenoxybenzene are characterized by stability at high temperatures substantially in excess of that characterizing unsubstituted polyphenyl ethers having 4 or 5 benzene rings. In addition, the chlorine derivatives are fluids in contrast to the unsubstituted diphenoxy benzenes. Surprisingly, the chlorine derivatives have excellent corrosion characteristics with all common metals other than copper.

In accordance with the present invention there are provided lubricant compositions comprising a mixture of a monochloro compound and a dichloro compound, each of which is represented by the general formula

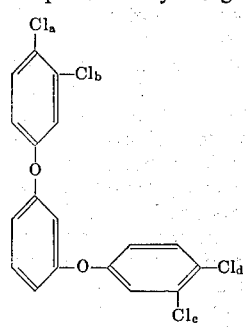

wherein each of $a$ to $d$ is zero or 1, the sum of $a$ to $d$ is 1 or 2, and a ring contains a maximum of one chlorine atom.

Another embodiment of this invention constitutes a method of lubricating relatively moving surfaces comprising maintaining upon the surface a lubricant film comprising a mixture of mono- and di-chloro compounds described above.

A further embodiment of this invention is a new process for preparing the compounds of the general formula, the process comprising reacting, in the absence of molecular oxygen, about one molar proportion of a dialkali metal salt of resorcinol, with from about 1 to about 3 molar proportions of monohalobenzene wherein the halogen is bromo or iodo, with from about 3 to about 1 molar proportions of a meta- or para-halochlorobenzene, wherein the halogen is bromo or iodo, in the presence of a copper salt catalyst and a solvent that forms coordinate convalent bonds with copper ions. Preferably, approximately one molar proportion of each of the monohalobenzene and of the halochlorobenzene are used, to produce a monochloro derivative in high yield and to minimize production of diphenoxybenzene.

Compounds of the general formula given above include: 1-(p-chlorophenoxy)-3-phenoxybenzene; 1 - (m-chlorophenoxy)-3-phenoxybenzene; 1-(3,4 - dichlorophenoxy)-3-phenoxybenzene; m-bis(m - chlorophenoxy)benzene, and m-bis(p-chlorophenoxybenzene). As indicated below, mixtures of such compounds are also contemplated herein.

The mixtures contemplated herein contain from about 10 to about 90, preferably from about 25 to about 75, percent by weight of one or more monochloro derivative and from about 90 to about 10 and preferably from about 75 to about 25 percent by weight of one or more dichloro derivative. The mixtures can contain up to to about 10 percent by weight of m-diphenoxybenzene.

The chloro derivatives of m-diphenoxybenzenes can be used in liquid or solid phase lubricating compositions, wherein they can constitute part or all of a lubricant vehicle. To take greater advantage of the high temperature stability of the chloro derivatives, it is preferred to use them in combination with other lubricants also chararterized by relatively high temperature stability. They can also be used with other stable lubricants to prevent or deter crystal formation. When used in a liquid lubricant composition together with a mineral or synthetic oil, the chloro derivatives can be present in amounts ranging from about 5 to about 95 percent by volume (weight). As a preferred range, the chloro derivatives can be so used in amounts ranging from about 25 to about 75 percent by volume (weight).

Other lubricants which can be so used with the chloro derivatives include hydrocarbon mineral oils, olefin and polyolefin fluids, alkylene oxide fluids, polyaryl ether and thio ether fluids, silicon-containing fluids, liquid polyacetate, and ester fluids. For example, the base media used according to this invention include the esters of dicarboxylic acids and monohydric alcohols and the trimethylol propane and pentaerylthritol esters of monocarboxylic acids.

As indicated above, the chloro derivatives can also be used as the sole vehicle in a grease composition or can be used in conjunction with other lubricants such as those mentioned above.

Thickening or gelling agents used in the grease compositions can be those available in the art and such as described in the Boner text "Manufacture and Application of Lubricating Greases." Thus, soaps, complex soaps, non-soaps such as clays and organic materials, can be used as the thickening or gelling agents. Such agents are generally used in amounts of from about 5 to about 30 percent by weight of the total weight of the grease.

As indicated above, the chloro derivatives can be prepared in a novel synthesis which is related to the process described in applications Ser. Nos. 416,127 and 490,072. In the prior process, a dialkali metal salt is reacted with an aryl halide, in the absence of molecular oxygen but in the presence of a copper salt catalyst and in a solvent that forms coordinate convalent bonds with copper ions. In contrast, the present process involves the use of a monohalobenzene reactant and a meta- or para-halochlorobenzene reactant with the dialkali metal salt of resorcinol.

The reaction involved in the formation of the desired chloro derivatives of m-diphenoxybenzene is illustrated below wherein disodium resorcinate is reacted with bromomobenzene and m-bromochlorobenzene, in pyrridine:

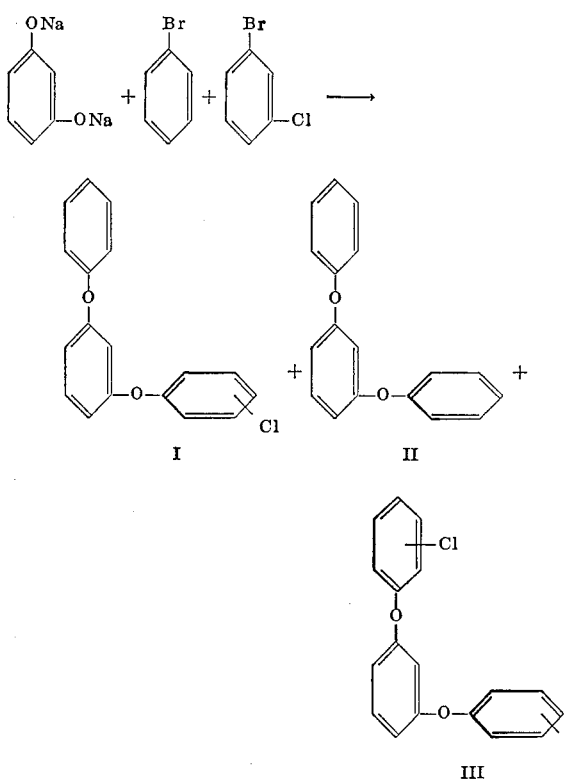

The chlorine atoms of I and II are meta and para to an ether oxygen therein.

When this reaction is carried out with an equal molar proportion of the reactants, the predicted distribution of products would be 2 molar proportions of I, 1 of II and 1 of III, assuming equal reactivities for bromobenzene and m-bromoclorobenzene. Yet, when equal molar proportions of reactants are employed, it has been found that the reaction product contains a ratio of: 2 of I, 0.69 of II and 1.67 of III. The smaller yield of m-diphenoxybenzene (II) is advantageous since this is a by-product of little value. Products I and III are useful oils.

The percent yield (36%, based upon resorcinal charge) of the most desired product, m-monochloro-m-diphenoxybenzene (I) is even higher in this one-step process, than in the known two-step process by way of m-phenoxyphenol intermediate wherein the yield is 32%, viz.:

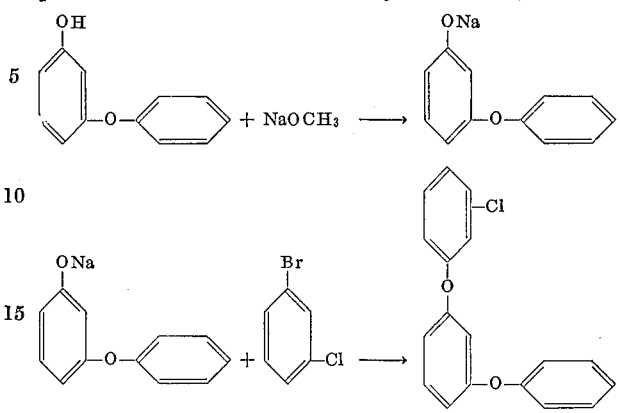

In the present process, it appears that bromochlorobenzene has greater reactivity than bromobenzene. The increased yield of desirable products is achieved at the expense of tars. Greater reaction rate reduces the opportunity for resorcinate salt to escape into tarry products.

In carrying out the process of this invention, it is essential that oxygen and molecular oxygen-containing gases be excluded. Thus, the process must be carried out in the absence of molecular oxygen. This can be accomplished by various means well known to those skilled in the art. For example, the process can be carried out under a blanket of inert (to the reaction) gases, such as nitrogen and flue gas.

One reactant is a dialkali metal salt of resorcinol. The hydroxyl groups of resorcinol can be converted to the corresponding-OM groups, wherein M is an alkali metal, by known methods as by reaction of resorcinol with a basic alkali metal compound, such as the alcoholate (methoxide), hydride, or hydroxide. Although any basic alkali metal compound can be used, the sodium and potassium compounds are generally used and are preferred. Both hydroxyl groups of resorcinol are converted to the alkali metal salt, i.e., by using substantially stoichiometric amounts of the basic alkali metal compound. An excess of basic compound should be avoided, because it interferes with the reaction and reduces yield. Water also slows the reaction and reduces yield. Accordingly, as when aqueous KOH or NaOH is used, steps should be taken to remove water, such as by azeotropic distillation with benzene, toluene, or the like.

The monohalobenzenes employed in the new process have either a bromo or an iodo group. Thus, bromobenzene and iodobenzene can be used. Similarly, the halochlorobenzenes employed have a bromo or an iodo group, and such group is positioned either meta or para to the chloro group. Typical of the halochlorobenzenes are: m-bromochlorobenzene, p-bromochlorobenzene, m-iodochlorobenzene and p-iodochlorobenzene. Inasmuch as meta-bromochlorobenzene and meta-iodochlorobenzene are relatively expensive, and inasmuch as the corresponding para compounds are much less expensive, the para compounds can be isomerized to mixtures of meta and para compounds containing relatively little undesirable ortho compound in order to employ a substantial amount of a meta compound.

The reaction between the alkali metal salt of the dihydric phenolic compound reactant and the aryl halide reactant is catalyzed by copper salts. Cupric and cuprous salts can both be used. Utilizable catalysts include cuprous chloride, cupric chloride, cuprous bromide, cupric bromide, cupric acetate, cupric sulfate, cupric acetylacetonate, and cuprous sulfate. As discussed hereinbefore, water appears to slow the reaction and decrease yields. Accordingly, in preferred practice, anhydrous copper salts should be used. The amount of catalyst used does not appear to be a critical factor. In practice, the process has been carried out using as little as 0.01 mole copper salt and as much as 0.25 mole per mole dihydric phenolic compound reactant.

An essential aspect of the process is the use of a suitable solvent. The solvents utilizable herein are characterized by the fact that they are polar organic solvents that form coordinate convalent bonds with copper ions. Thus, they will contain heteroatoms, such as sulfur, oxygen, nitrogen, and phosphorus. The utilizable solvents dissolve at least part of the copper catalyst and the resorcinate salt reactant. Types of solvents that are useful include aliphatic and aromatic amines: amine oxides; lactams; amides; sulfoxides; sulfones; heterocyclic oxygen, sulfur, and nitrogen compounds; phosphorus compounds; and ethers. The suitability of any particular solvent for use in the process can be readily determined by those skilled in the art. Upon adding a copper salt, e.g. cuprous chloride, to a portion of the solvent and warming, a characteristic blue or green color of the Werner coordination complex becomes evident with solvents utilizable herein and at least a portion of the copper salt dissolves. Non-limiting examples of solvents are amylamine; di-n-propylamine; di-n-butylamine; 2-ethylhexylamine; n-decylamine; aniline; N-amylaniline; m-ethylaniline; toluidine; caprolactam; N,N-diethylformamide; N,N-dimethylformamide; N-ethylacetamide, dimethyl sulfoxide; dipropyl sulfoxide; diheptyl sulfoxide; dimethyl sulfone; diethyl sulfone; di-n-propyl sulfone; pyridine; pyridine-N-oxide; quinoline-N-oxide; coumarone; benzothiophene; indole; collidine; pyrazole; thiazole; 2,3-dimethylthiophene; 2-methylthiophene, 1-methyl-2-pyrrolidinone; hexamethyl phosphoramide; di-n-butylether; di-iso-amylether; diheptylether; and bis(2-methoxyethyl) ether.

The amount of solvent used in the reaction does not appear to be a critical factor. There should be used an amount sufficient to provide easy handling of reactants and products, and to at least partially dissolve the catalyst complex and the resorcinate salt reactant. It will be noted that complete solution of the catalyst and the resorcinate salt are not necessary, because, as reaction proceeds, additional solution can take place until reaction is substantially complete. On the other hand, an excessive amount of solvent can slow the reaction rate. Typical, feasible amounts of solvent for various catalysts and phenol salt reactants are illustrated in the specific working examples.

The process is readily carried out at temperatures between about 50° C. and about 200° C. Higher temperatures can be used, but they generally serve no useful purpose. Preferably, temperatures between about 100° C. and about 175° C. will be used. In many cases, operating at or near refluxing temperature is satisfactory, such as with pyridine (about 117° C.). The time of reaction will be between about one hour and about 200 hours. As in most chemical processes, the temperature and time of reaction are inversely related.

The products made by the process can be separated from the reaction mixture by techniques well known to those skilled in the art.

In general, as much of the solvent as possible is distilled off and the remaining reaction mixture is contacted with acidified water to remove the catalyst. In the case of water-soluble solvents (e.g., dimethyl sulfoxide), any remaining solvent will dissolve in the aqueous phase. When using basic solvents (e.g. pyridine), there should be sufficient acid used to neutralize the solvent remaining. Then, the crude product is extracted with a paraffinic or aromatic hydrocarbon solvent (e.g. hexane, pentane, heptane, benzene, and toluene). In general the reaction products are obtained as the residue, after unreacted material and by-products have been removed. Neutral products can be purified by distillation or by recrystallization from acetone, alcohol, light petroleum solvents, aromatic hydrocarbons, etc. Typical techniques are demonstrated in the specific examples, infra.

The following examples are for the purpose of illustrating the process of this invention. It is not to be limited to the reactants and solvents used in the examples. As will be apparent to those skilled in the art, a variety of other reactants and solvents can be employed.

Examples 1 and 2 illustrate compounds which are useful as lubricants. Example 3 shows an isomer of the compounds of Examples 1 and 2, the isomer having such a relatively high viscosity at low temperature (0° C.) that it is unsuitable as a lubricant. Example 4 shows that when both chlorine atoms are on one benzene ring, the viscosity at low temperature (0° C.) is too high and the product is less desirable as a lubricant. Example 5 illustrates a dichloro m-diphenoxybenzene suitable as a lubricant. Examples 6 and 7 illustrate the new process, and the products thereof are also suitable as excellent high temperature lubricants.

EXAMPLE 1

1-(p-chlorophenoxyl)-3-phenoxybenzene

A 1 liter 4-neck flask was fitted with stirrer, a 10" vacuum-jacketed Vigreux column and a nitrogen inlet tube. The flask was flushed with nitrogen and an atmosphere of nitrogen was maintained therein during all subsequent operations in the flask. Pyridine (400 ml.) was introduced. In this was dissolved 111.5 g. (0.600 mole) of m-phenoxyphenol, by stirring in the flask. Then 31.0 g. (0.575 mole) of sodium methoxide powder was added slowly with stirring. Stirring was continued and 300 ml. of a mixture of methanol with pyridine was distilled out. The Vigreux column was then replaced by a reflux condenser and a thermometer was introduced into the liquid in the 1 liter flask. Next 172 g. (0.900 mole) of melted 4-bromochlorobenzene at 80° C. was poured into the still warm contents of the flask. This was followed at once by 5.0 g. of cuprous chloride with stirring continued. The resulting mixture was then brought to slow reflux at a pot temperature of 125° C. The mixture was held at this temperature with stirring under nitrogen for 18 hours. The reaction mixture was then poured into a solution of 400 ml. of concentrated hydrochloric acid in 2 liters of water and stirred for 5 minutes.

The organic layer which formed was allowed to settle and the aqueous layer which had formed was decanted off the top. The organic layer was dissolved in 500 ml. of benzene and transferred to a separatory funnel. There it was washed by 200 ml. of concentrated hydrochloric acid in 200 ml. of water, followed by 100 ml. of concentrated hydrochloric acid in 200 ml. of water. The benzene solution was next washed by 250 ml. of aqueous 10% sodium hydroxide solution, and finally by 300 ml. of water. Benzene was then distilled off through a 10" vacuum-jacketed Vigreux column. The residue was distilled under vacuum to give 56 g. of recovered 4-bromochlorobenzene and 143 g. of 1 - (p-chlorophenoxy)-3-phenoxybenzene, distilling at 168–170° C. at 0.4 mm. Hg. This appears to be a new compound.

Analysis.—Calculated for $C_{18}H_{13}ClO_2$: C, 72.85; H, 4.43; Cl, 11.95. Found: C, 72.51; H, 4.42; Cl, 11.8.

EXAMPLE 2

1-(m-chlorophenoxy)-3-phenoxybenzene

This preparation was carried out just as in Example 1, except that 110 g. (0.575 mole) of 3-bromochlorobenzene were substituted for the 172 g. (0.900 mole) of 4-bromochlorobenzene. Amounts of all other materials were unchanged. The final distillation under vacuum gave 137 g. of 1-(m-chlorophenoxy)-3-phenoxybenzene, distilling at 163–167° C. at 0.3 mm. Hg.

Analysis.—Calculated for $C_{18}H_{13}ClO_2$: C, 72.85; H, 4.43. Found: C, 72.33; H, 4.36.

EXAMPLE 3

1-(o-chlorophenoxy)-3-phenoxybenzene

This preparation was carried out just as in Example 2, except that 110 g. (0.575 mole) of 2-bromochlorobenzene were substituted for 110 g. (0.575 mole) of 3-bromochlorobenzene. The final distillation under vacuum gave 111 g. of 1-(o-chlorophenoxy)-3-phenoxybenzene, distilling at 164–165° C. at 0.3 mm. Hg. The distillate later solidified to a solid melting at 46–47° C. This appears to be a new compound.

*Analysis.*—Calculated for $C_{18}H_{13}ClO_2$: C, 72.85; H, 4.43. Found: C, 72.55; H, 4.55.

EXAMPLE 4

1(2,4-dichlorophenoxy)-3-phenoxybenzene

A 2 liter, 4-neck flask was fitted with stirrer, a 10" vacuum-jacketed Vigreux column and a nitrogen inlet tube. The flask was flushed with nitrogen, and an atmosphere of nitrogen maintained therein during all subsequent operations in the flask. Pyridine (550 ml.) was introduced. In this was dissolved 173 g. (0.930 mole) of m-phenoxyphenol, by stirring in the flask. Then 47.7 g. (0.885 mole) of sodium methoxide powder was added slowly with stirring. Stirring was continued and 330 ml. of a mixture of methanol with pyridine was distilled out. The Vigreux column was then replaced by a reflux condenser and a thermometer was introduced into the liquid in the 2 liter flask.

Next, 200 g. (0.885 mole) of 4-bromo-1,2-dichlorobenzene was poured into the still warm contents of the flask. This was washed in by 50 ml. of pyridine, and followed at once by 7.8 g. of cuprous chloride with stirring continued. The resulting mixture was then brought to a pot temperature of 120° C. and held at this temperature for 18 hours with stirring under nitrogen. The reaction mixture was then poured into a solution of 600 ml. of concentrated hydrochloric acid in 3 liters of water and stirred for 5 minutes. The aqueous layer which formed was decanted from the lower organic layer, and the organic layer which formed was washed by 2 liters of water by decantation. The organic layer was dissolved in 600 ml. of benzene and transferred to a separatory funnel. There it was twice washed by 200 ml. portions of concentrated hydrochloric acid in 200 ml. of water. The benzene solution was then filtered through a porous glass disk to remove a trace of solids. The benzene solution was next washed by two 200 ml. portions of aqueous 10% sodium hydroxide solution. These were followed by a wash with 800 ml. of 10% sodium chloride solution, and then by a wash with 600 ml. of water. Benzene was then distilled off through a 10" vacuum-jacketed Vigreux column. The residue was distilled under vacuum to give 186 g. of 1-(3,4 - dichlorophenoxy) - 3 - phenoxybenzene, distilling at 178–185° C. at 0.35 mm. Hg. This appears to be a new compound.

*Analysis.*—Calc'd for $C_{18}H_{12}Cl_2O_2$ (percent): C, 65.28; H, 3.65. Found (percent): C, 65.10; H, 3.65.

EXAMPLE 5 m-Bis(m-chlorophenoxy)benzene

A 2 liter, 4-neck flask was fitted with stirrer, a Dean-Stark trap under a condenser and a nitrogen inlet tube. All reactions in the flask were carried out under nitrogen. A suspension of 55.0 g. (0.500 mole) of resorcinol was made in 800 ml. of benzene in the flask. Then, 51.8 g. (0.960 mole) of sodium methoxide was added slowly with stirring. Methanol and benzene were then distilled out to leave a dry resorcinol disalt in the flask. Next, 800 ml. of pyridine was added to the flask. The Dean-Stark trap was removed from under the condenser, and a thermometer was introduced into the pyridine. The contents of the flask were stirred and heated to 90° C. Then, 287 g. (1.50 mole) of 3-bromochlorobenzene was poured in. This was followed at once by 15.0 g. of cuprous chloride. The resulting mixture was brought up to a pot temperature of 115° C. and held at this temperature with stirring under nitrogen for 18 hours. The Dean-Stark trap was then reinserted and 500 ml. of pyridine was distilled out over a period of 1½ hours. The reaction mixture was then poured into 400 ml. of concentrated hydrochloric acid in 2 liters of water. The mixture was stirred for 5 minutes and the upper aqueous layer which formed was then decanted off. A pasty organic layer remained; it was washed by decantation with 110 ml. of concentrated hydrochloric acid in 100 ml. of water. The crude product was taken up in 700 ml. of benzene and filtered through diatomaceous earth. The residue was washed on the filter with 200 ml. of benzene, and the washings added to the filtrate. The benzene solution was then washed in a separatory funnel by 100 ml. of concentrated hydrochloric acid in 100 ml. of water. Next the benzene solution was washed by two 200 ml. portions of aqueous 10% sodium hydroxide, and finally by 400 ml. of water. Benzene was then distilled off through a 12" vacuum-jacketed Vigreux column. The residue was distilled under vacuum to give 61 g. of recovered 3-bromochlorobenzene and 91 g. of m-bis(m-chlorophenoxy)benzene distilling at 185–187° C. at 0.2 mm. Hg.

EXAMPLE 6 m-Bis(mixed-chlorophenoxy)benzene of high m-chlorophenoxy content

A 5 liter 4-neck flask was fitted with stirrer, a Dean-Stark trap under a condenser and a nitrogen inlet tube. All reactions in the flask were carried out under nitrogen. A suspension of 137.6 g. (1.250 mole) of resorcinol was made in 2 liters of benzene in the flask. Then 132.4 g. (2.460 mole) of sodium methoxide was added slowly with stirring. Methanol and benzene were then distilled out to leave a dry resorcinol disalt in the flask. Next, 2 liters of pyridine was added to the flask. The Dean-Stark trap was removed from under the condenser, and a thermometer was introduced into the pyridine. The contents of the flask were stirred and heated to 100° C. Then, 945 g. (4.95 moles) of mixed bromochlorobenzene isomers were poured in.

These isomers were obtained by isomerizing 4-bromochlorobenzene at 70° C. by aluminum bromide and concentrating the desired isomers by distillation at atmospheric pressure through a 12" vacuum-jacketed Vigreux column. The isomerization procedure employed is that of G. A. Olah, W. S. Tolgyesi, and R. E. A. Dear in J. Org. Chem., 27, 3455–3464 (1962). Analysis of the isomers used, by means of 12' UCON 550X gas chromatography column, showed the distribution:

| | Percent |
|---|---|
| o-Bromochlorobenzene | 6.4 |
| p-Bromochlorobenzene | 26.8 |
| m-Bromochlorobenzene | 66.8 |

Immediately after adding the bromochlorobenzene isomers, 38.0 g. of cuprous chloride was added. The resulting mixture was brought to a pot temperature of 117° C. and held at this temperature with stirring under nitrogen for 15 hours. The reflux condenser was then replaced by a 12" vacuum-jacketed Vigreux column and 1600 ml. of pyridine was distilled off over a period of 6 hours, with a rise in pot temperature to 134° C. The reaction mixture was then poured into 800 ml. of concentrated hydrochloric acid in 4 liters of water. The aqueous layer which formed was decanted off and discarded. A pasty organic layer remained; it was then washed by decantation by 2 liters of water. The crude product was taken up in 1200 ml. of benzene and filtered through diatomaceous earth. This residue was washed on the filter by 300 ml. of benzene, and the washings added to the filtrate. The benzene solution was transferred to a separatory funnel and washed twice by 100 ml. portions of concentrated hydrochloric acid in 500 ml. of water. The benzene solution was then washed with two 200 ml. portions of aqueous 10% sodium hydroxide, and finally by 1200 ml. of water. Benzene was then distilled off through a 12" vacuum-jacketed Vigreux column. Distillation was continued at atmospheric pressure to give 450 g. of recovered bromochlorobenzene isomers distilling at 185–196° C. The residue was distilled through the column under vacuum to give 258 g. of m-bis(mixed chlorophenoxy)benzene, distilling at 175–178° C. at 0.3 mm. Hg.

*Analysis.*—Calculated for $C_{18}H_{12}Cl_2O_2$ (percent): C, 65.28; H, 3.65. Found (percent): C, 64.88; H, 3.73.

EXAMPLE 7

(A) Mixed m- and p-chloro derivatives in 1-(mixed-chlorophenoxy)-3-phenoxybenzene and
(B) Mixed m- and p-chloro derivatives in m-bis(mixed-chlorophenoxy)benzene A 5 liter, 4-neck flask was fitted with stirrer, a 20" vacuum-jacketed Vigreux column and a nitrogen inlet tube. All reactions in the flask were carried out under nitrogen. A suspension of 147.0 g. (1.335 moles) of resorcinol was made in 1600 ml. of benzene in the flask. The suspension was warmed to 60° C. with rapid stirring. Then 141.5 g. (2.62 moles) of sodium methoxide was added as a stream of powder with rapid stirring under nitrogen continued. Methanol plus 1200 ml. of benzene was distilled out over a period of 3 hours to leave a slurry of resorcinol disalt in benzene. Next, 1500 ml. of pyridine was added and 700 ml. of a mixture of benzene with pyridine was distilled out. Then, an additional 900 ml. of pyridine was added to the flask. A mixture of 420 g. (2.67 moles) of bromobenzene with 512 g. (2.67 moles) of a mixture of meta- and para-bromochlorobenzenes was then poured into the flask.

The mixture of bromochlorobenzene isomers was obtained earlier by isomerization of 4-bromochlorobenzene by aluminum bromide, using the procedure identified in Example 6. The ortho-isomer content was reduced to 3% by fractional distillation through a 20" Vigreux column. 4-bromochlorobenzene was then blended with this distillate to reduce the ortho-isomer impurity to 2%. Gas chromatography on the blend of isomers showed the 3-bromochlorobenzene content to be 48% and the 4-bromochlorobenzene content to be 50%. After the bromides had been added to the reaction mixture, 40.0 g. of cuprous chloride was introduced. The Vigreux column was replaced by a reflux condenser and a thermometer was immersed in the reaction mixture. The pot temperature was brought to 115° C. and held at that temperature with stirring under nitrogen for 16 hours. Then, the Vigreux column was put in place of the reflux condenser and 1400 ml. of pyridine was distilled off over a 5-hour period. The resulting reaction mixture was then poured into 1200 ml. of concentrated hydrochloric acid in 4 liters of water and stirred for 5 minutes. The aqueous layer which formed was decanted off and discarded. Then, the remaining crude product was dissolved in 1 liter of benzene and filtered through diatomaceous earth. The residue was washed on the filter by 800 ml. of benzene, and the washings added to the filtrate. In a separatory funnel, the benzene solution was washed by 200 ml. of concentrated hydrochloric acid in 200 ml. of water, and then by 1 liter of water. The benzene solution was then washed by two 400 ml. portions of aqueous 5% sodium hydroxide, followed by 800 ml. of water. Benzene and bromobenzene were distilled off through a 12" Vigreux column. Distillation was then continued at reduced pressure through a 20" vacuum-jacketed Vigreux column. Bromochlorobenzenes recovered were 175 g. and bromobenzene 184.5 g. Product A, 122 g. distilled at 162–172° C. at 0.2 mm. Hg. and was mainly 1-(mixed-chlorophenoxy)-3-phenoxybenzene with minor amounts of m-diphenoxybenzene and m-bis(mixed-chlorophenoxy)benzene. Product B, 124 g., distilled at 172–185° C. at 0.2 mm. Hg. was m-bis(mixed-chlorophenoxy)benzene, approximately 68 percent by weight, with a lesser amount, about 31 weight percent, of 1-(mixed-chlorophenoxy)-3-phenoxybenzene.

The composition and properties of the entire reaction product and of products A and B are given below:

| | Reaction Product | Product A | Product B |
|---|---|---|---|
| Weight, grams | 246 | 122 | 124 |
| m-Diphenoxybenzene (m-DPB), wt. percent | 10 | 19 | 1 |
| Chloro-DPB, wt. percent | 45 | 59 | 31 |
| Dichloro-DPM, wt. percent | 45 | 22 | 68 |
| KV at 0° F., cs | 10,400 | 5,400 | 24,500 |
| KV at 100° F., cs | 18.01 | 15.96 | 20.89 |
| KV at 210° F., cs | 3.12 | 2.96 | 3.33 |
| Pour point, °F | −30 | −50 | −55 |
| Hours at 585° F. for absorption of 1 mole of $O_2$ per kg | | 43.3 | 42.6 |

Viscosities and pour points of monochloro and dichloro derivatives of m-diphenoxybenzene are provided in Table I below. Advantages over a 4-ring polyphenyl ether in both viscosity at 0° F. and pour point are shown. As evidenced by data for the ortho isomer of Example 3, i.e. wherein chlorine is ortho to the ether linkage, undesirably high viscosity at 0° F. characterized the isomer. This is consistent with data for 2,4-diphenoxychlorobenzene wherein chlorine is also ortho to the ether linkage. The mixed-dichloro product of Example 6 contains about 6 percent by weight of the chlorine atoms ortho to the ether linkage, and has a higher viscosity than that of the product of Example 5 wherein all chlorine atoms are meta to the ether linkage. The two products, A and B, of Example 7 are both oils of low 0° F. viscosity and contain only 2% of the chlorine ortho to ether linkages. Surprisingly, mixing of monochloro and dichloro products provides the advantages of lower pour points, −50° F. and −55° F. as compared with −15° F. to −30° F.

TABLE I.—VISCOSITIES AND POUR POINTS OF MONOCHLORO AND DICHLORO DIPHENOXYBENZENES

| Example | KV at 210° F., cs. | KV at 100° F., cs. | KV at 0° F., cs. | Pour Point- °F. |
|---|---|---|---|---|
| 1 | 2.99 | 16.18 | 6,280 | −25 |
| 2 | 2.92 | 15.68 | 4,860 | −25 |
| 3 | 3.62 | 25.78 | [1] 66,530 | |
| 4 | 3.92 | 30.58 | >99,000 | −15 |
| 5 | 3.43 | 22.54 | 30,040 | −30 |
| 6 | 3.59 | 24.55 | 53,540 | −25 |
| 7A | 2.96 | 15.96 | 5,400 | −50 |
| 7B | 3.33 | 20.89 | 24,500 | −55 |
| 4P3E comparison [2] | 6.3 | 69.6 | >99,000 | +20 |

[1] Viscosities at 100° F. and 0° F. are on a supercooled liquid; the melting point of this solid isomer is 115–116.5° F.
[2] This is a commercial polyphenyl ether having four benzene rings.

Oxidation-stability of both monochloro and dichloro derivatives of m-diphenoxybenzene is approximately twice as great as that of a commercial polyphenyl ether lubricant. This is shown in Table II, below. Rates of oxidation at 585° F. in the Dornte-type oxidation test (Ind. Eng. Chem. 28, 26 (1936)), are approximately ½ of that for the commercial polyphenyl ether. Since this oxidation stability is inherent in the chloro derivatives, such derivatives are advantageous in blends with less oxidation-resistant oils with or without antioxidants present.

TABLE II

Non-catalytic oxidation tests on monochloro and dichloro m-diphenoxybenzenes at 585° F. in oxygen

| Example: | Time, hrs.[1] |
|---|---|
| 1 | 38.9 |
| 2 | 62.0 |
| 3 | 51.3 |
| 4 | 44.4 |
| 5 | 61.5 |
| 6 | 55.0 |
| 7A | 43.3 |
| 7B | 42.6 |
| 5P4E comparison [2] | 19.2 |

[1] These are the times required for the sample to absorb 1 mole of $O_2$ per kg. of oil.
[2] This is a commercial polyphenyl ether having five rings.

Oxidation-corrosion test data is provided in Table III, following. The chloro derivatives of m-diphenoxybenzene exhibit very little acid formation or viscosity change at 500° F. They are substantially superior to a commercial type II jet oil (full formulation) in these respects as well as in sludge and lacquer formation. There is significant corrosion, but almost none for a bronze.

TABLE III.—OXIDATION-CORROSION TESTS AT 500° F. FOR 48 HOURS [1]

| Oil or Metal After Oxidation | Ex. 1 | Ex. 6 | Commercial Type II Jet Oil (inhibited) |
|---|---|---|---|
| Percent viscosity increase at 100° F | −4 | +4 | +34,500. |
| Total acid number | 0.02 | 0.13 | 7.3. |
| Sludge in oil | None | None | Heavy. |
| Lacquer | do | do | Very heavy. |
| Percent lost as vapor | 1.0 | 1.0 | 6.0. |
| Weight loss of metal, mg./sq. cm.: | | | |
| Ag | 0.1 | 0.4 | 0.0. |
| Steel | 0.1 | 0.2 | 0.0. |
| Al | 0.1 | 0.0 | |
| Mg | 0.0 | 0.0 | Disintegrated. |
| Ti | 0.1 | 0.0 | |
| General Elec. bronz | 0.1 | 0.1 | |
| Copper | [2] 2.1 | [2] 3.8 | 0.0. |

[1] This is Federal Test Method 791, Method 5308, modified. Metals are present as standard washers. Tests are on 100 g. samples of oil with an air flow of 5 liters per hours.
[2] These tests on copper were made separately and prolonged to 72 hours.

Lubrication test data for the 4-ball machine test are given in Table IV, below. The chloro derivatives of m-diphenoxybenzene exhibit significantly superior lubrication, to that obtained by use of commercial polyphenyl ethers. For steel-on-steel lubrication, wear values are in the range of values obtained with esterlubes.

TABLE IV.—4-BALL MACHINE TESTS WITH STEEL ON STEEL [1]

| Sample | Wear Rate cc./cm. x 10″ | | Average $f^2$ at 500° F. | Wear Scar diameter, mm. | |
|---|---|---|---|---|---|
| | 350° F. | 500° F. | | 350° F. | 500° F |
| Commercial ester lubricant | 0.20 | 7.60 | 0.103 | 0.43 | 0.95 |
| 5P4E comparison | 37.0 | 13.9 | 0.205 | 1.42 | 1.11 |
| 4P3E comparison | 44.4 | 14.1 | 0.171 | 1.48 | 1.12 |
| Example 1 | 5.32 | 15.5 | 0.167 | 0.88 | 1.14 |
| Example 6 | | | 1.087 | | |
| Example 7B | 6.98 | 8.96 | 0.145 | 0.94 | 1.00 |

[1] Tests were conducted for 60 minutes at 1200 r.p.m. on 52100 Steel with 40 kg. load.
[2] $f$ is coefficient of friction.

Data set forth above in Table I–IV reveal that the chloro derivatives have properties making them suitable for use in lubricants for use in lubricating high temperature jet engines. The derivatives are even more resistant to oxidation than polyphenyl ethers, and lubricate better in the 4-ball machine. Low temeprature properties are substantially superior to those of unsubstituted polyphenyl ethers; pour points are as low as −55° F. as opposed to +20° F. for 4P3E. The derivatives have low corrosivity for metals, including magnesium, under oxidizing conditions; this is unexpected in view of the known corrosivity of a variety of other chlorine-containing organic compounds.

The chloro derivatives are also desirable for use as lubricants in view of their relatively high fire points. For example, the fire point of the 1-(p-chlorophenoxy)-3-phenoxybenzene described in Example 1 is 500° F. and of the mixed dichloro product of Example 6 is 600° F.

EXAMPLE 8

Mixtures of monochloro and dichloro derivatives of m-diphenoxybenzene were prepared and the viscosities and pour points of the mixtures were determined.

First a mixture of (8A) of the monochloro compounds prepared in Example 1 and 2 were prepared by mixing 50 parts of 1-(p-chlorophenoxy)-3-phenoxybenzene—pour point, −25° F., and KV at 0° F., 6280 cs.— and 50 parts of 1-(m-chlorophenoxy)-3-phenoxybenzene—pour point, −25° F., and KV at 0° F., 4860 cs.

The dichloro product (8B) used was prepared as described in Example 6. It contained a predominant amount of dichloro isomers since it was prepared from mixed bromochlorobenzene isomers having the following approximate weight balance:

| | Percent |
|---|---|
| Ortho | 2.8 |
| Meta | 86.6 |
| Para | 10.6 |

The product has a pour point of −30° F. and a KV at 0° F. of 42,000 centistokes.

Mixtures of 8A and 8B had the following properties:

| Percent wt. | | Pour Point, ° F. | K.V. at 0° F., cs. |
|---|---|---|---|
| A | B | | |
| 75 | 25 | −45 | 8,800 |
| 25 | 75 | −35 | 23,800 |

It is unexpected that the 75% A-25% B mixture has a pour point lower than either A or B alone, each of which has a pour point of −25° F. Similarly, the viscosity is substantially different from that which would represent a calculated weighted average of 3 parts of A and 1 part of B. A corresponding unexpected viscosity value is found for the 25% A–75% B mixture. The viscosity values, 8800 and 23,800 cs., for the two mixtures reveal the mixtures to be excellent for use at relatively low temperatures.

What is claimed is:
1. A lubricant composition containing lubricating amounts of a mixture of from about 10 to about 90 percent by weight of a monochloro compound and from about 90 to about 10 percent by weight of a dichloro compound, each of which is represented by the general formula

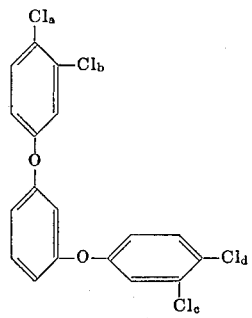

wherein each of $a$ to $d$ is zero or 1, the sum of $a$ to $d$ is 1 or 2, and a ring contains a maximum of one chlorine atom.

2. A composition of claim 1 wherein the monochloro compound is

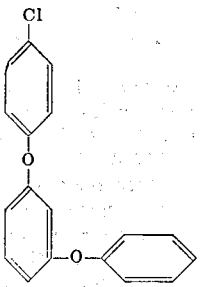

3. A composition of claim 1 wherein the monochloro compound is

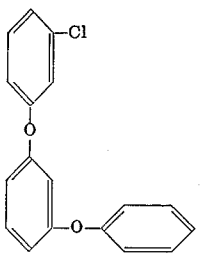

4. A composition of claim 1 wherein the dichloro compound is

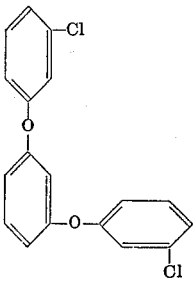

5. A composition of claim 1 containing from about 25 to about 75 percent by weight of the monochloro compound and from about 75 to about 25 percent by weight of the dichloro compound.

6. A composition of claim 1 containing up to about 10 percent by weight of m-diphenoxybenzene.

7. A lubricant composition comprising lubricating amounts of an oil of lubricating viscosity and of a mixture defined by claim 1.

8. The method of lubricating relatively moving metallic surfaces, which comprises maintaining upon said surfaces a lubricant film of a mixture defined by claim 1.

References Cited

UNITED STATES PATENTS

| | | | |
|---|---|---|---|
| 2,022,634 | 11/1935 | Britton et al. | 252—54 X |
| 3,294,846 | 12/1966 | Livak et al. | 260—613 |
| 3,379,771 | 4/1968 | Irick et al. | 252—54 X |

DANIEL E. WYMAN, Primary Examiner

W. CANNON, Assistant Examiner

U.S. Cl. X.R.

260—613